US012383941B2

(12) United States Patent
McGuire et al.

(10) Patent No.: US 12,383,941 B2
(45) Date of Patent: Aug. 12, 2025

(54) APPARATUS FOR CLEANING A SURFACE WITH A LIQUID JET AND RELATED METHODS

(71) Applicant: Path Environmental Technology, LLC, Houston, TX (US)

(72) Inventors: Adam McGuire, The Woodlands, TX (US); Kelan McElduff, Fair Haven, NJ (US); William B Thrasher, Galveston, TX (US); Gard Cole Parkinson, Jr., Houston, TX (US)

( * ) Notice: Subject to any disclaimer, the term of this patent is extended or adjusted under 35 U.S.C. 154(b) by 490 days.

(21) Appl. No.: 17/848,801

(22) Filed: Jun. 24, 2022

(65) Prior Publication Data

US 2022/0410221 A1 Dec. 29, 2022

Related U.S. Application Data

(60) Provisional application No. 63/214,759, filed on Jun. 24, 2021.

(51) Int. Cl.
*B08B 9/047* (2006.01)
*B08B 9/093* (2006.01)

(52) U.S. Cl.
CPC ............ *B08B 9/047* (2013.01); *B08B 9/0936* (2013.01)

(58) Field of Classification Search
CPC ....... B08B 9/047; B08B 9/049; B08B 9/0936; B08B 9/0433; B24C 3/325; B24C 1/086; B24C 1/003; B24C 5/04; B42C 3/06
See application file for complete search history.

(56) References Cited

U.S. PATENT DOCUMENTS

| | | | | | |
|---|---|---|---|---|---|
| 2,763,964 | A * | 9/1956 | Luce | B24C 9/00 | 451/75 |
| 4,006,890 | A * | 2/1976 | Vainer | B23K 7/10 | 33/21.3 |
| 4,205,828 | A * | 6/1980 | Hooper | B23K 7/001 | 266/77 |
| 5,255,853 | A * | 10/1993 | Munoz | B08B 3/024 | 239/433 |
| 5,536,200 | A * | 7/1996 | Kiess | B05B 3/06 | 451/75 |
| 5,759,086 | A * | 6/1998 | Klingel | B24C 1/045 | 451/99 |
| 5,992,404 | A * | 11/1999 | Bleyer | E04F 21/0084 | 451/36 |
| 6,113,475 | A * | 9/2000 | Masuda | B24C 1/003 | 451/76 |
| 6,126,524 | A * | 10/2000 | Shepherd | B24C 1/00 | 451/75 |

* cited by examiner

*Primary Examiner* — Joel D Crandall

(57) ABSTRACT

Apparatus for cleaning a surface with a liquid jet, the apparatus having: a main housing; a primary fluid conduit having a longitudinal axis and two ends, a fluid-intake end and a fluid-exit end; a gear assembly configured to engage the primary fluid conduit and rotate the primary fluid conduit about the primary-fluid-conduit longitudinal axis; a nozzle connected pivotally to the pivot pin; the hydraulic cylinder mounted to the main housing and configured to move the hydraulic-cylinder rod along a linear path by exerting a unidirectional force upon the first end of the hydraulic-cylinder rod; the hydraulic-cylinder rod positioned within the fluid conduit and the second end of the hydraulic-cylinder rod pivotally connected to the nozzle; and the nozzle configured to pivot about the pivot-pin longitudinal axis as the hydraulic-cylinder rod moves along the linear path.

13 Claims, 13 Drawing Sheets

APPARATUS FOR CLEANING A SURFACE WITH A LIQUID JET AND RELATED METHODS

CROSS-REFERENCE TO RELATED APPLICATIONS

This patent application claims priority to U.S. provisional patent application 63/214,759 filed on Jun. 24, 2021; the subject matter of which is incorporated into this application in its entirety.

BACKGROUND OF THE INVENTION

Storage tanks, such as those used to store crude oil or other carbon-containing fluids, are well known. There remains a need for an apparatus that can be used to clean the interior surfaces of storage tanks that are used to store crude oil or other carbon-containing fluids.

BRIEF SUMMARY OF THE INVENTION

Apparatus for cleaning a surface with a liquid jet, the apparatus having: a main housing; a primary fluid conduit having a longitudinal axis and two ends, a fluid-intake end and a fluid-exit end; a gear assembly configured to engage the primary fluid conduit and rotate the primary fluid conduit about the primary-fluid-conduit longitudinal axis; a motor mounted to the main housing and configured to engage the gear assembly and thereby rotate the primary fluid conduit about the primary-fluid-conduit longitudinal axis; a bifurcated head connected to the primary-fluid-conduit fluid-exit end, the bifurcated head having at least one fluid conduit; a hydraulic cylinder; a hydraulic-cylinder rod having a first end and a second end; a pivot pin having a longitudinal axis and the pivot pin being attached to the bifurcated head; a nozzle connected pivotally to the pivot pin; the hydraulic cylinder mounted to the main housing and configured to move the hydraulic-cylinder rod along a linear path by exerting a unidirectional force upon the first end of the hydraulic-cylinder rod; the hydraulic-cylinder rod positioned within the fluid conduit and the second end of the hydraulic-cylinder rod pivotally connected to the nozzle; and the nozzle configured to pivot about the pivot-pin longitudinal axis as the hydraulic-cylinder rod moves along the linear path.

Apparatus for cleaning a surface with a liquid jet, the apparatus having: a main housing; a primary fluid conduit having a longitudinal axis and two ends, a fluid-intake end and a fluid-exit end; a gear assembly configured to engage the primary fluid conduit and rotate the primary fluid conduit about the primary-fluid-conduit longitudinal axis; a motor mounted to the main housing and configured to engage the gear assembly and thereby rotate the primary fluid conduit about the primary-fluid-conduit longitudinal axis; a bifurcated head connected to the primary-fluid-conduit fluid-exit end, the bifurcated head having parallel fluid conduits; a hydraulic cylinder; a hydraulic-cylinder rod having a first end and a second end; a pivot pin having a longitudinal axis and the pivot pin being attached to the bifurcated head; a nozzle connected pivotally to the pivot pin; the hydraulic cylinder mounted to the main housing and configured to move the hydraulic-cylinder rod along a linear path by exerting a unidirectional force upon the first end of the hydraulic-cylinder rod; the hydraulic-cylinder rod positioned within the fluid conduit and the second end of the hydraulic-cylinder rod pivotally connected to the nozzle; the nozzle configured to pivot about the pivot-pin longitudinal axis as the hydraulic-cylinder rod moves along the linear path; a mounting flange upon which the apparatus is configured to mount to a substantially planar surface; a controller configured to independently rotate the primary fluid conduit by engaging the motor and independently pivot the nozzle by engaging the hydraulic cylinder; and a rotational positional sensor that is configured to sense the rotational position of the primary fluid conduit.

Apparatus for cleaning a surface with a liquid jet, the apparatus having: a main housing; a primary fluid conduit having a longitudinal axis and two ends, a fluid-intake end and a fluid-exit end; a gear assembly configured to engage the primary fluid conduit and rotate the primary fluid conduit about the primary-fluid-conduit longitudinal axis; a motor mounted to the main housing and configured to engage the gear assembly and thereby rotate the primary fluid conduit about the primary-fluid-conduit longitudinal axis; a bifurcated head connected to the primary-fluid-conduit fluid-exit end, the bifurcated head having at least one fluid conduit; a cylinder; a cylinder rod having a first end and a second end; a pivot pin having a longitudinal axis and the pivot pin being attached to a head having a fluid-conduit therein; a nozzle connected pivotally to the pivot pin; the cylinder mounted to the main housing and configured to move the cylinder rod along a linear path by exerting a unidirectional force upon the first end of the cylinder rod; the cylinder rod positioned within the fluid conduit and the second end of the cylinder rod pivotally connected to the nozzle; and the nozzle configured to pivot about e pivot-pin longitudinal axis as the cylinder rod moves along the linear path.

DETAILED DESCRIPTION OF THE INVENTION

Very generally, inventive embodiments are directed to an apparatus for cleaning a surface with a liquid jet.

Figure 2:
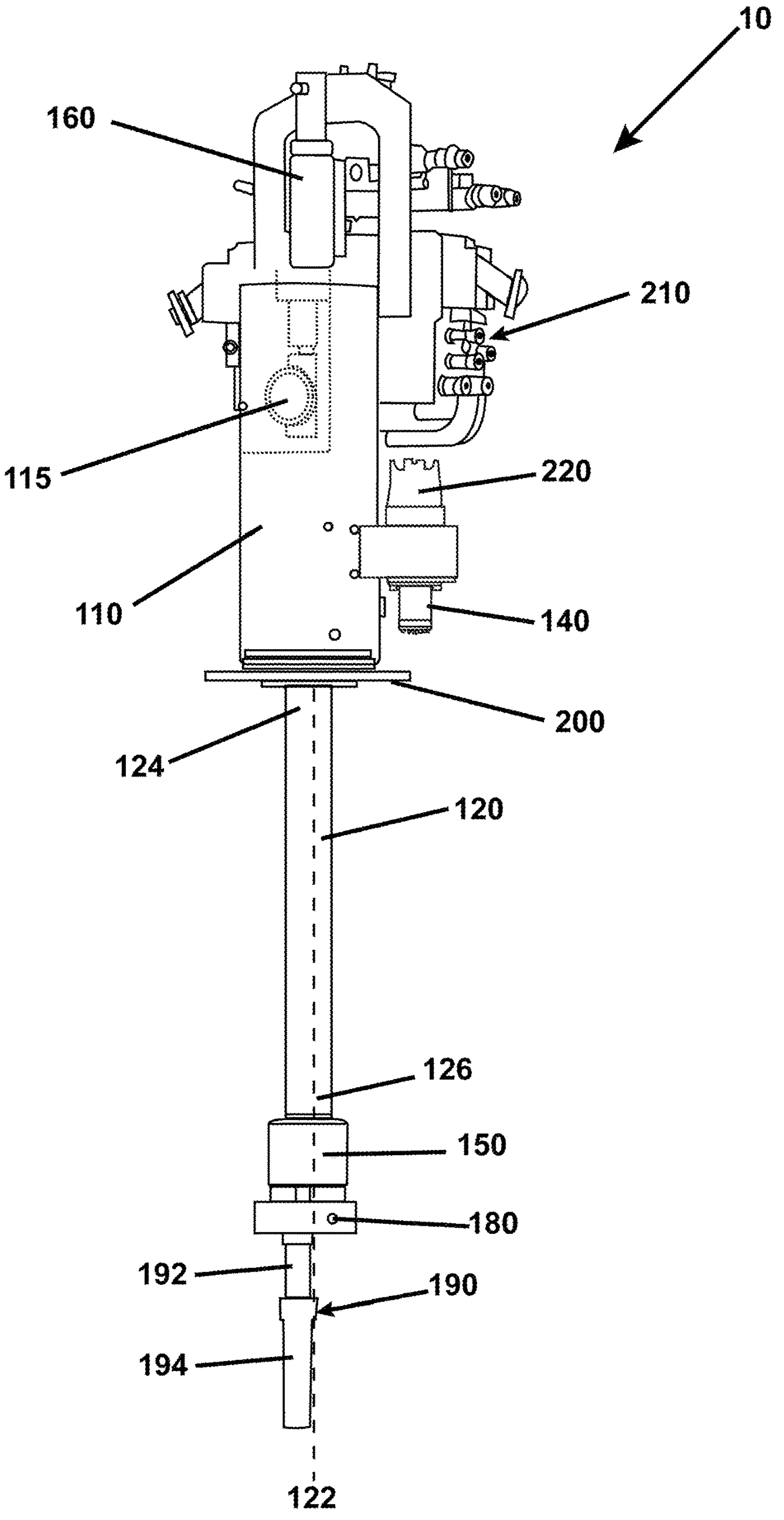
FIG. 2 is a side view of an embodiment.
Figure 3:
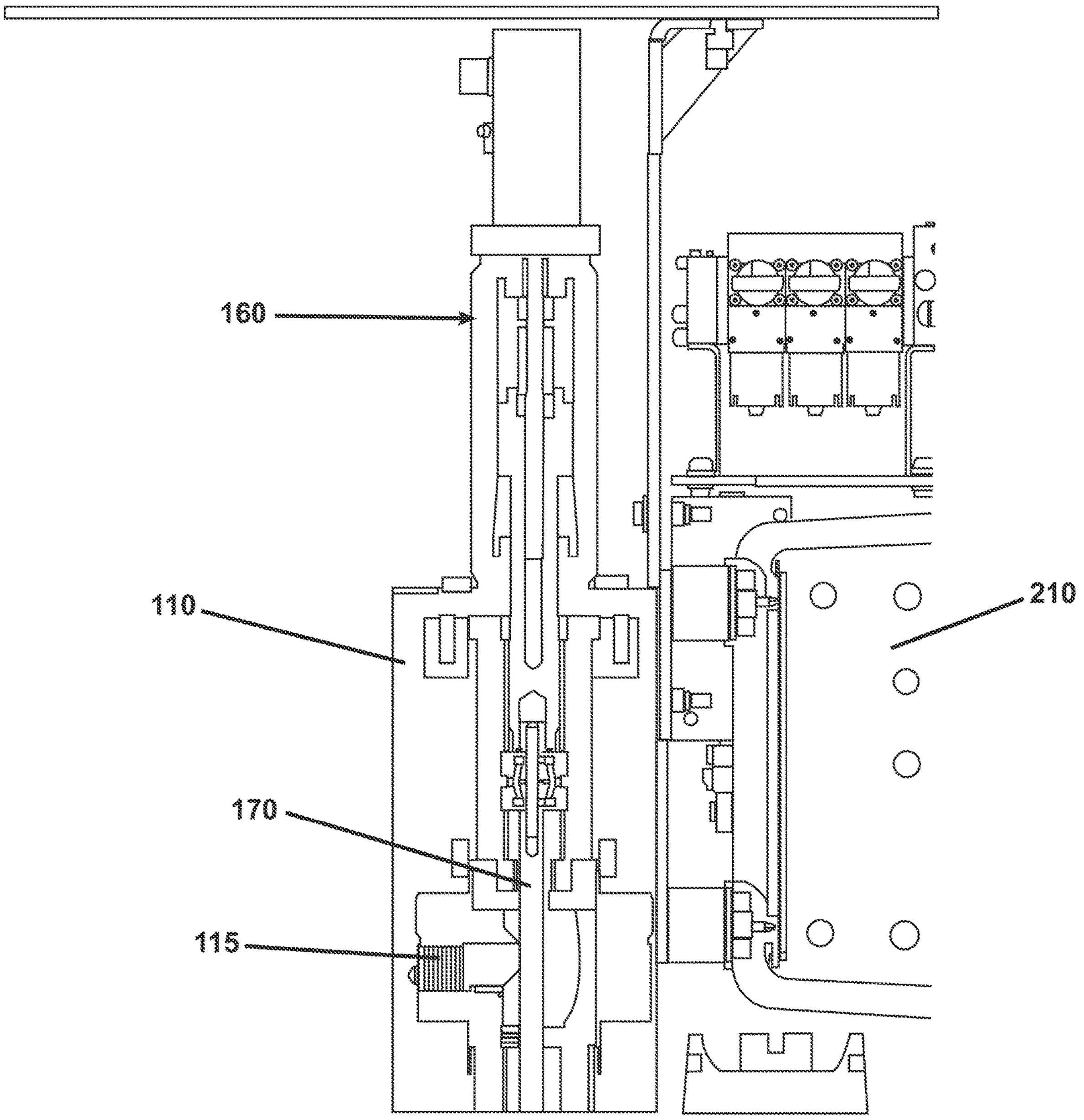
FIG. 3 is a cross-sectional side view of a portion of an embodiment.
Figure 4:
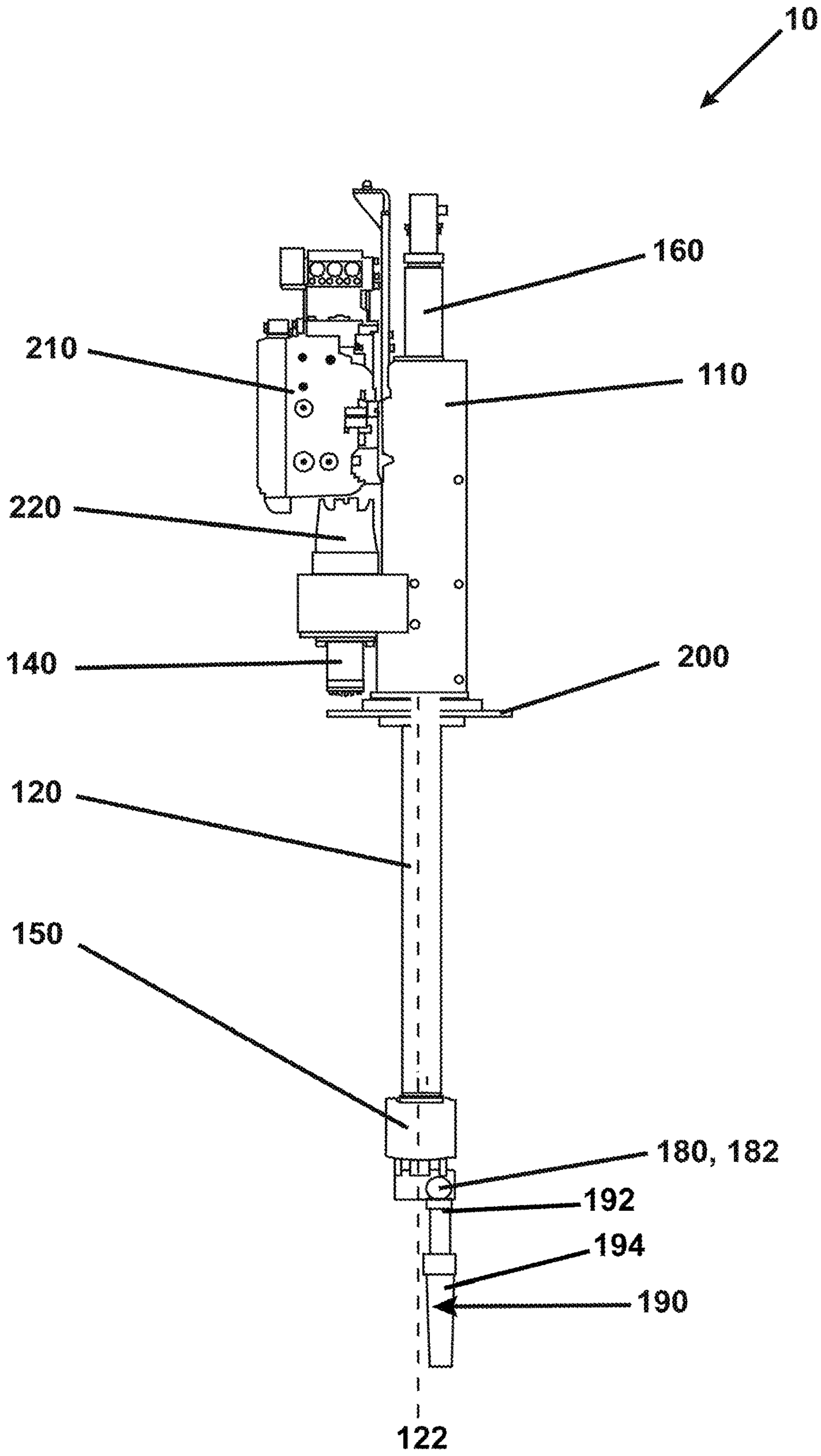
FIG. 4 is a side view of an embodiment.
Figure 5:
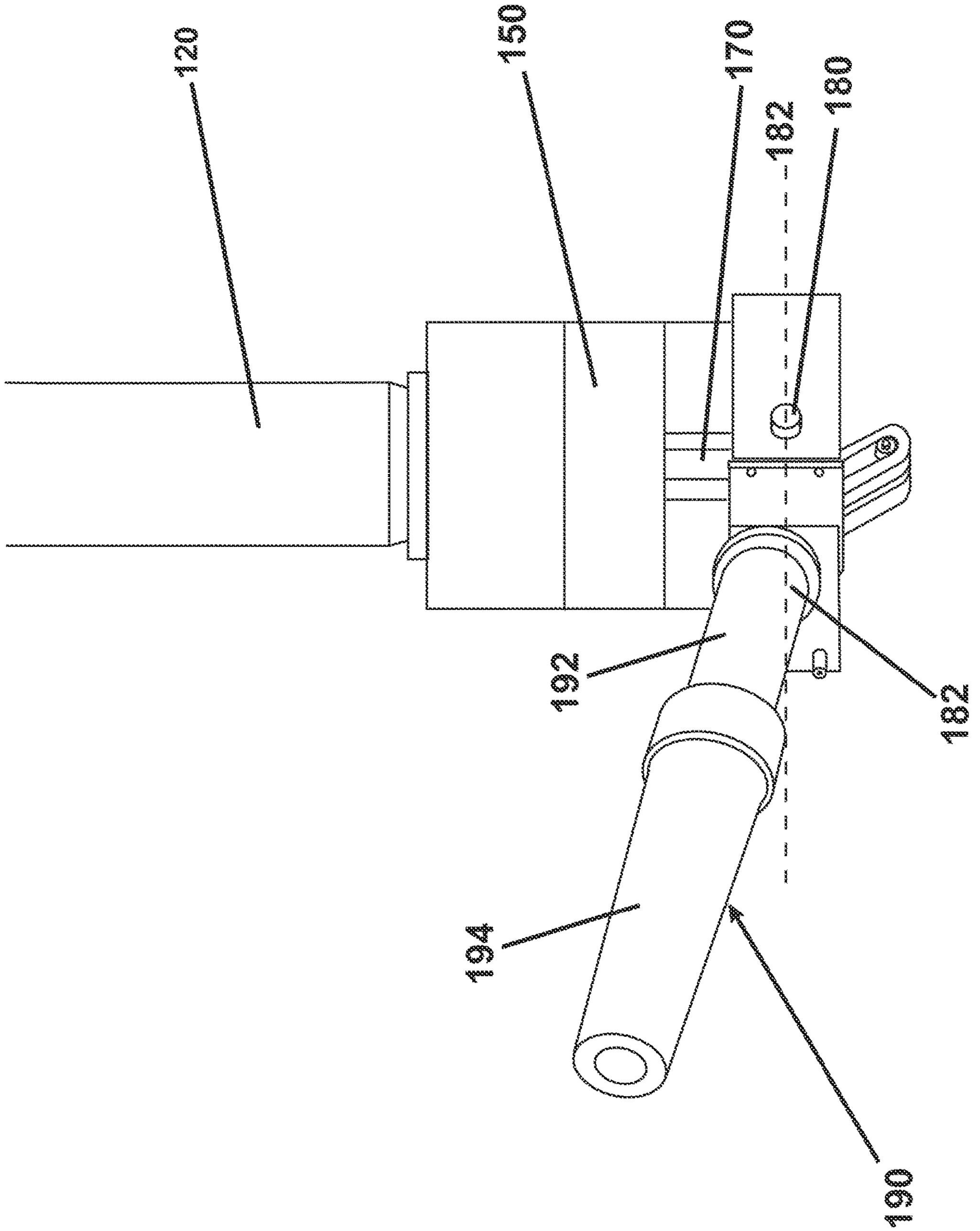
FIG. 5 is a side view of a portion of an embodiment.
Figure 6:
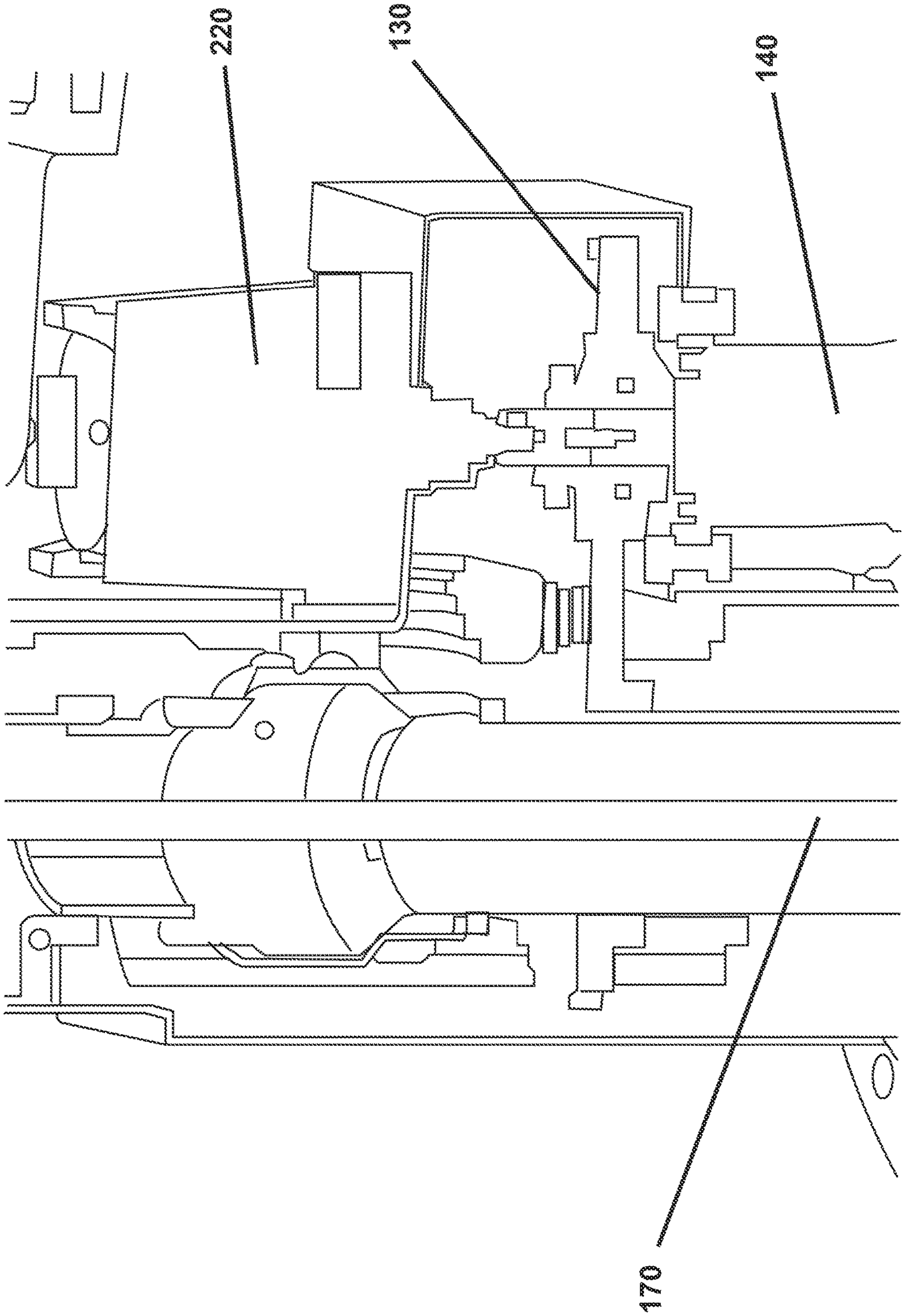
FIG. 6 is a cross-sectional perspective view of a portion of an embodiment.
Figure 8:
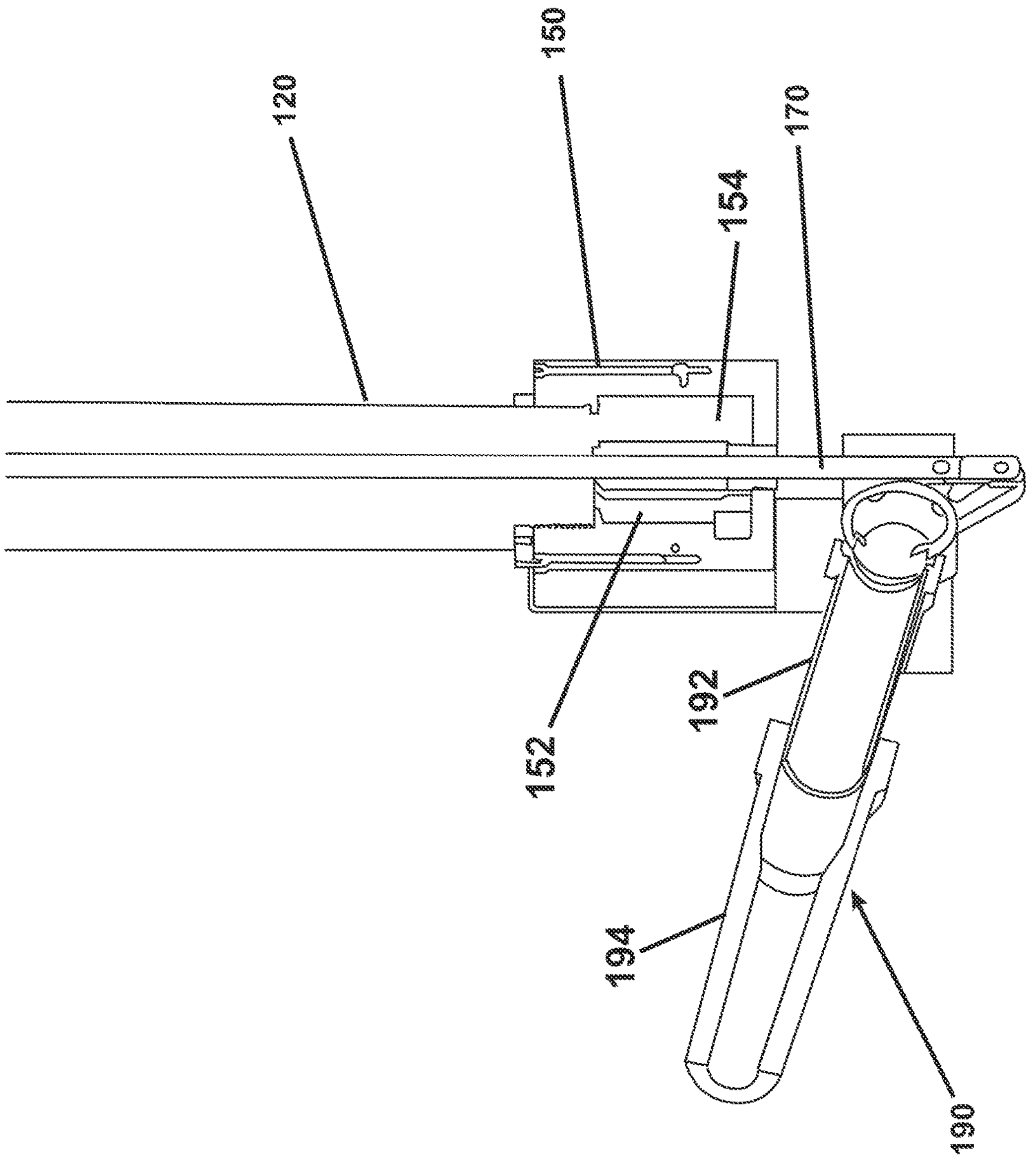
FIG. 8 is a cross-sectional perspective view of a portion of an embodiment.
Figure 10:
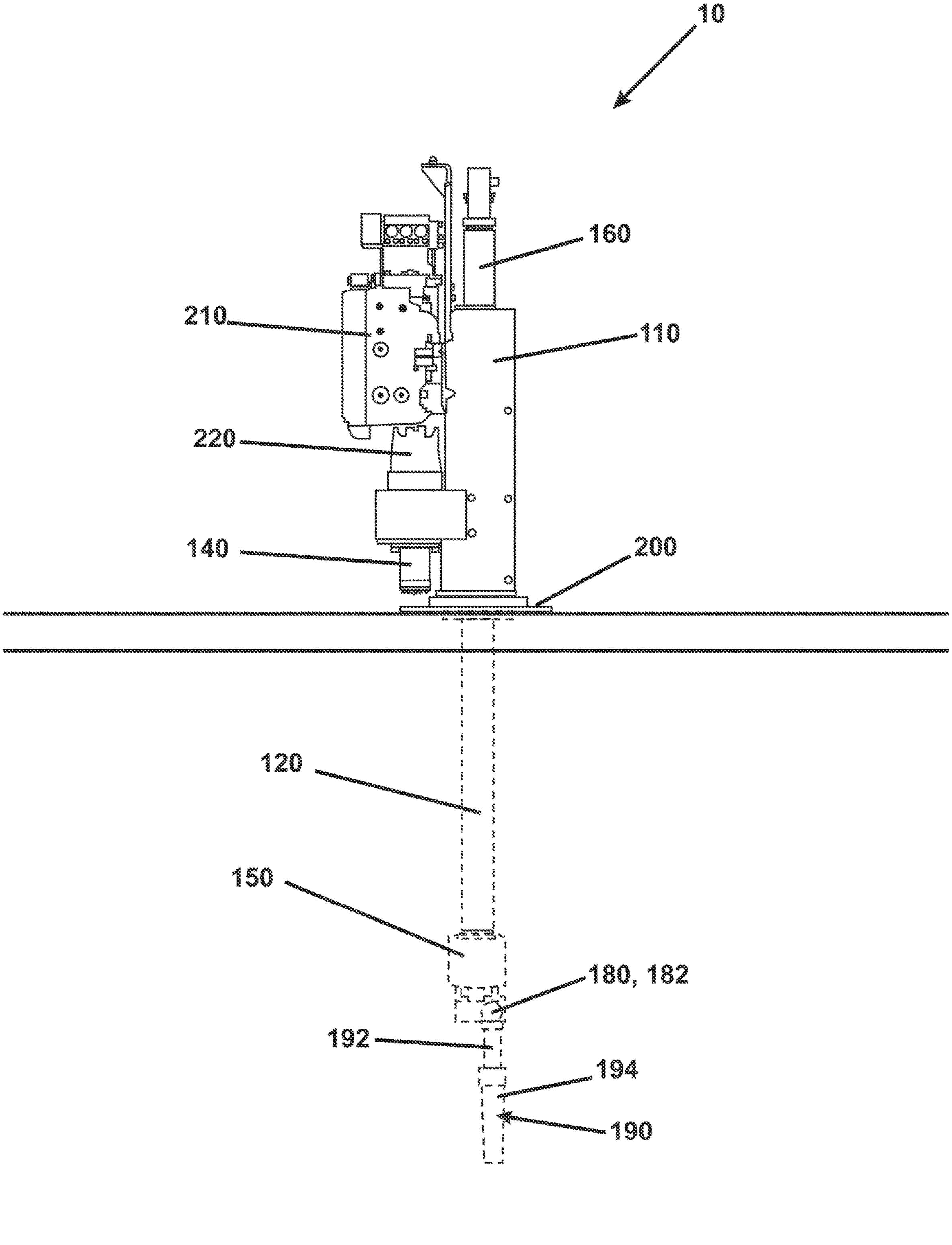
FIG. 10 is a side view of an embodiment mounted to a storage-tank rooftop.

With reference to the figures, apparatus 10 has main housing 110 that houses a plurality of mechanical elements and also acts as a fixed substrate upon which a plurality of mechanical elements are mounted. Hydraulic cylinder 160 is fixedly mounted on an exterior end portion of main housing 110 and hydraulic cylinder 160 is configured to implement a unidirectional force upon hydraulic-cylinder rod 170 wherein as hydraulic cylinder 160 moves from a retracted position towards the bottom of the hydraulic-cylinder stroke, a downward force is exerted upon hydraulic-cylinder-rod first end 172 thereby causing hydraulic-cylinder rod 170 to move along a linear path away from a retracted position towards an extended position. Conversely, as hydraulic cylinder 160 moves from the bottom of the hydraulic-cylinder stroke towards a retracted position, hydraulic cylinder 160 relieves the downward force upon hydraulic cylinder rod 170 thereby causing hydraulic cylinder rod 170 to move away from an extended position and towards a retracted position. By causing hydraulic cylinder rod 170 to extend and retract along a linear path, hydraulic cylinder 160 indirectly causes nozzle 190 to pivot between two positions; the first position being a position that nozzle 190 is in as a result of hydraulic cylinder 160 being in a fully retracted position (as shown in FIGS. 2, 4, and 10) and the second position being a position that the nozzle is in as a result of hydraulic cylinder 160 being in a fully extended position (as shown in FIGS. 5 and 8). In an embodiment, hydraulic cylinder 160 includes a linear sensor (not shown) configured to sense the position of a piston's relative position within the cylinder, thereby enabling a calculation directed to determining nozzle 190's angular degree of pivot relative to primary-fluid-conduit longitudinal axis 122.

In an embodiment, the angle created by the nozzle first position and the nozzle second position is greater than 90°. In another embodiment, the angle created by the nozzle first position and the nozzle second position is at least 80°. In still another embodiment, the angle created by the nozzle first position and the nozzle second position is about 110°.

Figure 1:
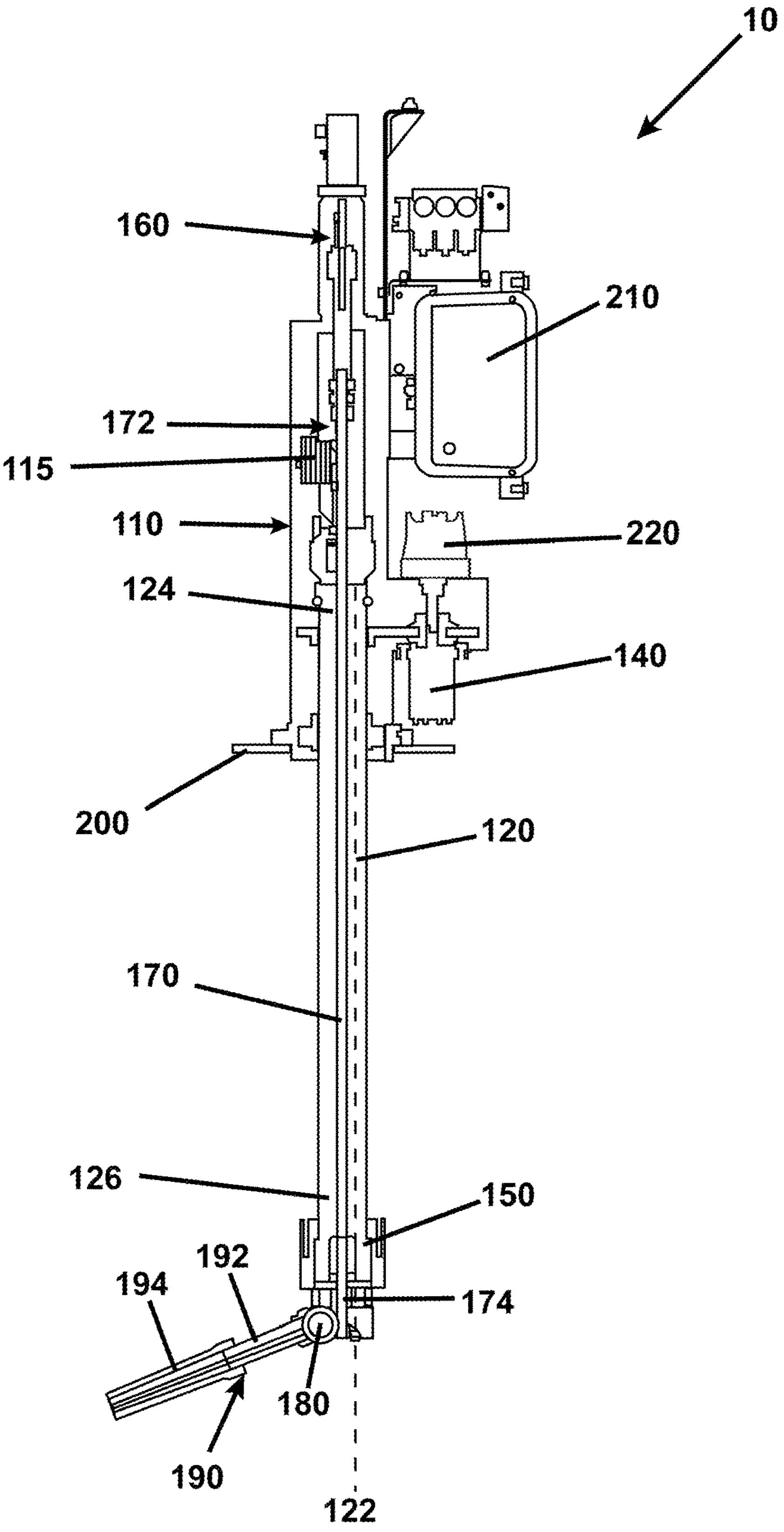
FIG. 1 is a cross-sectional side view of an embodiment.

Nozzle 190 pivots between nozzle first position and nozzle second position by pivoting about pivot pin longitudinal axis 182 that is shown in FIG. 5. Pivot pin 180 is fixedly attached to bifurcated head 150 in a position that is perpendicular or radial to the linear path of hydraulic cylinder rod 170, and nozzle 190 pivots about pivot pin 180. Hydraulic-cylinder-rod second end 174 is pivotally connected to nozzle 190 such that when hydraulic-cylinder rod 170 is in a retracted position, nozzle 190 is pivoted into nozzle first position (as shown in FIGS. 2, 4, and 10) about pivot-pin longitudinal axis 182. And when hydraulic-cylinder rod 170 is fully extended from its retracted position, nozzle 190 is pivoted into nozzle second position (as shown in FIGS. 5 and 8) about pivot-pin longitudinal axis 182. Nozzle 190 is configured to pivot in a plane between the nozzle first position and the nozzle second position. Hydraulic-cylinder rod 170 is positioned within primary fluid conduit 120 and extends out of primary fluid conduit 120 to its pivotal connection to nozzle 190. Nozzle 190 may occupy any intermediate position between the nozzle first position and the nozzle second position; the position of nozzle 190 as shown in FIG. 1 is an example of such an intermediate nozzle position.

Apparatus 10 is further configured to rotate primary fluid conduit 120 at least 360° in either direction about primary-fluid-conduit longitudinal axis 122. As shown in the figures, because rotatable primary-fluid-conduit fluid-exit end 126 is connected to nozzle 190 via bifurcated head 150, nozzle 190 also rotates about primary-fluid-conduit longitudinal axis 122 as primary fluid conduit 120 rotates about primary-fluid-conduit longitudinal axis 122; as one rotates so does the other in an equal degree. Motor 140 is mounted to main housing 110 and configured to engage gear assembly 130 that is further configured to engage and rotate the primary fluid conduit 120 about primary-fluid-conduit longitudinal axis 122. Motor 140 and gear assembly 130 are configured to rotate primary fluid conduit 120 at least 360° in either a first direction or a second direction. In embodiments, motor 140 and gear assembly 130 are configured to rotate primary fluid conduit 120 continuously in a first direction, e.g., clockwise, or in a second direction, e.g., counterclockwise. In an embodiment, rotational position sensor 220 is mounted to main housing 110 in a location that allows for sensing either directly or through gear movement, the rotational position of primary fluid conduit 120.

In an embodiment, apparatus 10 is configured to independently pivot nozzle 190 at least 90° in a plane while also being independently configured to rotate nozzle 190 at least 360° about primary-fluid-conduit longitudinal axis 122. Because apparatus 10 has an independently pivoting nozzle 190 and an independently rotating nozzle 190, apparatus 10 is capable of emitting a substantially linear fluid jet or fluid spray to a target substrate in a wide variety of patterns and configurations.

Figure 7:
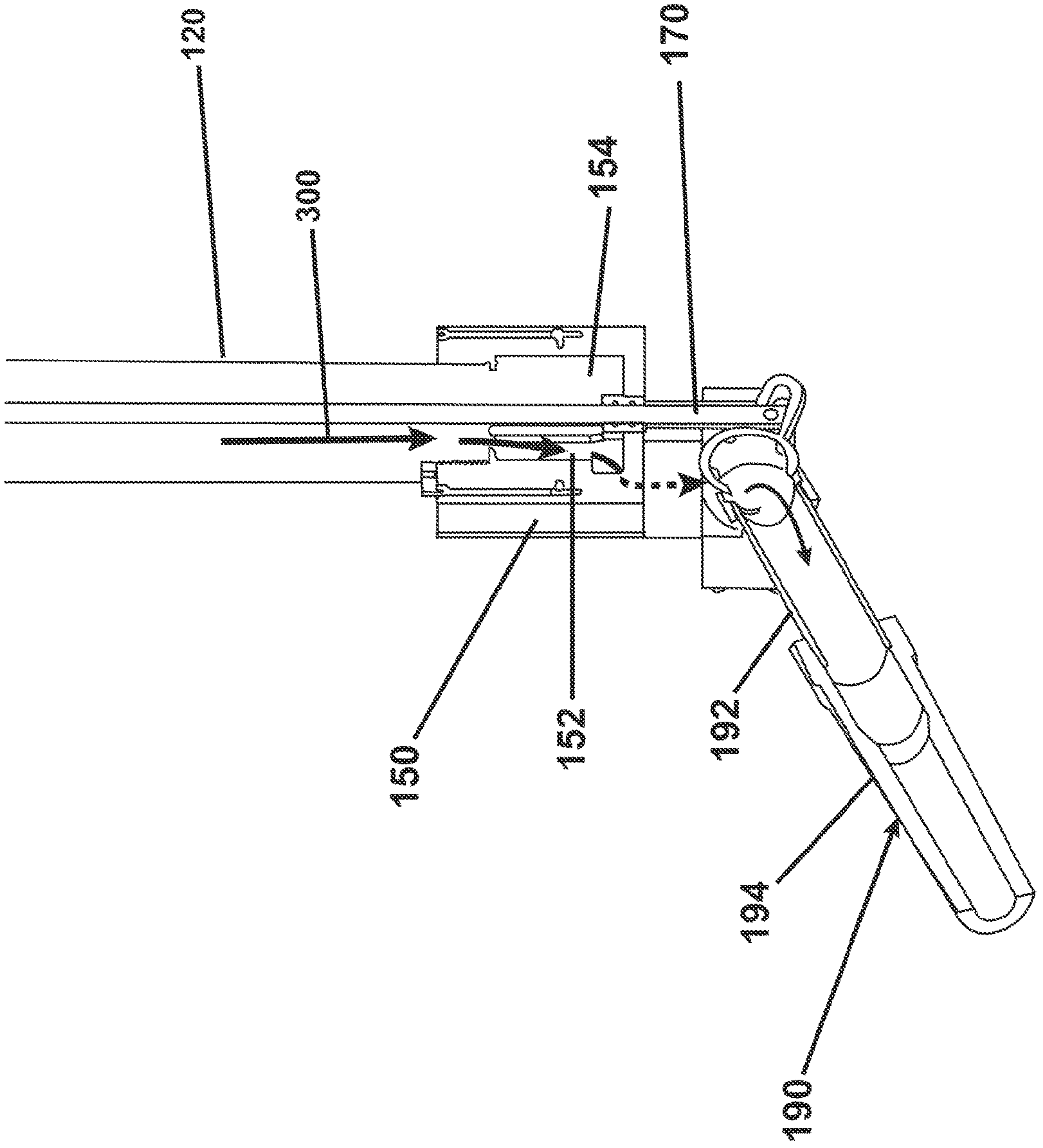
FIG. 7 is a cross-sectional perspective view of a portion of an embodiment.
Figure 13:
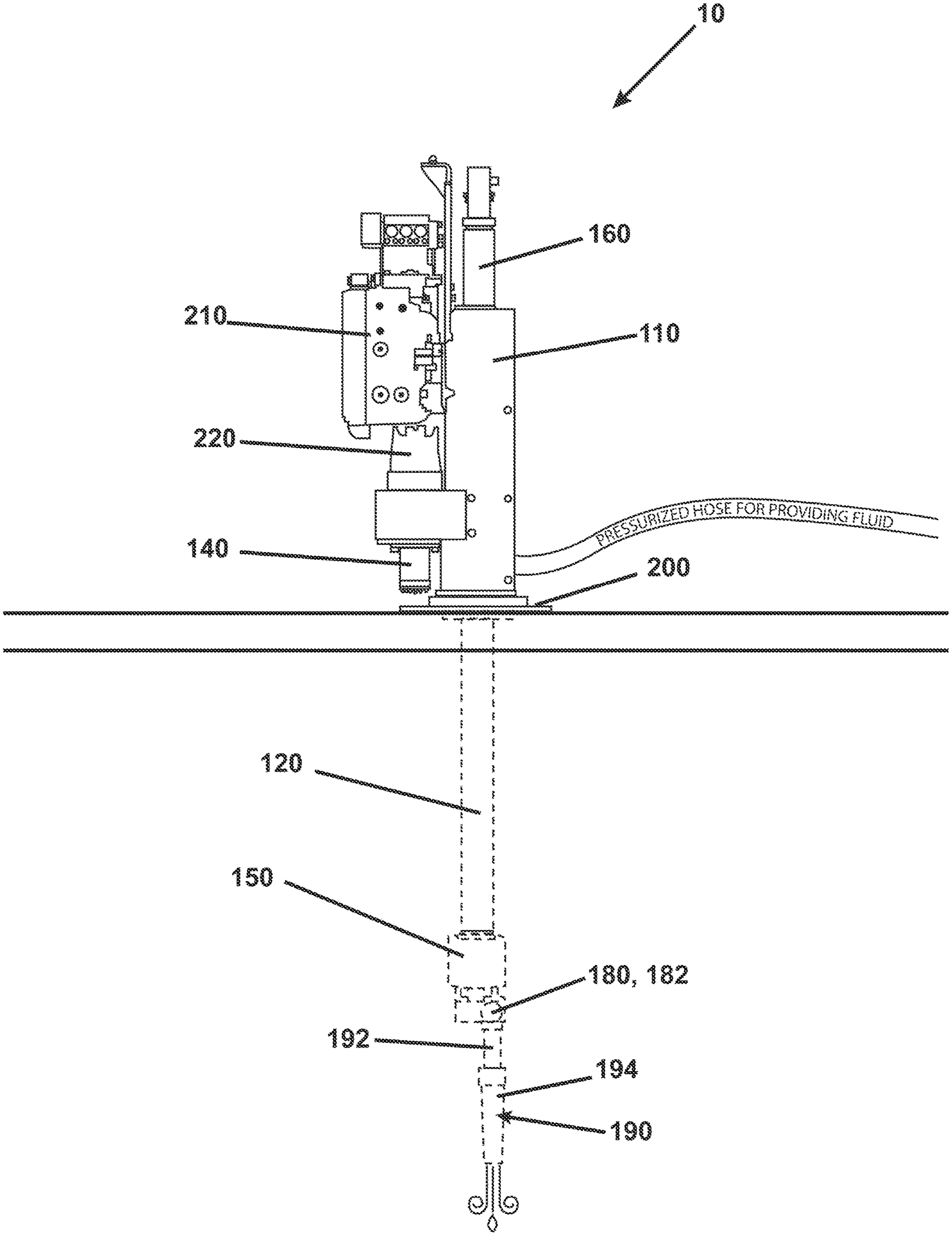
FIG. 13 is a side view of an embodiment mounted to a storage-tank rooftop and in use.

Fluid flow into and out of apparatus 10 is as follows. In operation, and as shown in FIG. 13, a pressurized hose, conduit, pipe, or known fluid-flow element introduces fluid into apparatus 10 through fluid intake port 115 and then fluid flows from fluid intake port 115 into primary fluid conduit 120 via primary-fluid-conduit fluid-intake end 124. As shown in the figures, primary-fluid-conduit fluid-intake end is positioned substantially within main housing 110, and fluid intake port 115 is configured to removably attach to a hose, conduit, pipe, or known fluid-flow element that is configured to deliver fluid into fluid intake port 115. After entering into fluid intake port and then into primary fluid conduit 120 via primary-fluid-conduit fluid-intake end 124, and as illustrated with the arrows (in FIG. 7) showing fluid-flow path 300, fluid flows through primary fluid conduit 120 and into bifurcated head 150. Then, from bifurcated head 150, the fluid enters into and subsequently exits nozzle 190. In embodiments, primary fluid conduit 120 is tubing having a three-inch diameter. Bifurcated head 150 is configured to split fluid flow from primary fluid conduit 120 into each of the two fluid-flow paths or parallel fluid conduits 152, 154 within bifurcated head 150. Bifurcated head 150 is configured such that both of the parallel fluid conduits 152, 154 lead from primary fluid conduit 120 and enter into nozzle 190. In embodiments, the parallel fluid conduits 152, 154 are respectively configured to enter into opposite sides of nozzle 190. In embodiments, nozzle 190 includes nozzle straightener 192 and nozzle tip 194. In embodiments, nozzle straightener 192 is tubular having a diameter that is 1.5 inches. In embodiments, nozzle 190 has nozzle tip 194 having a fluid-emitting orifice that has a diameter ranging from 0.5 to 1.0 inches. Nozzle tip 194 can be any known nozzle tip and can be configured to emit a substantially linear jet of fluid or any variety of known fluid spray configurations. In embodiments, the emitted jet of fluid is substantially non-diffused and linear.

Figure 9:
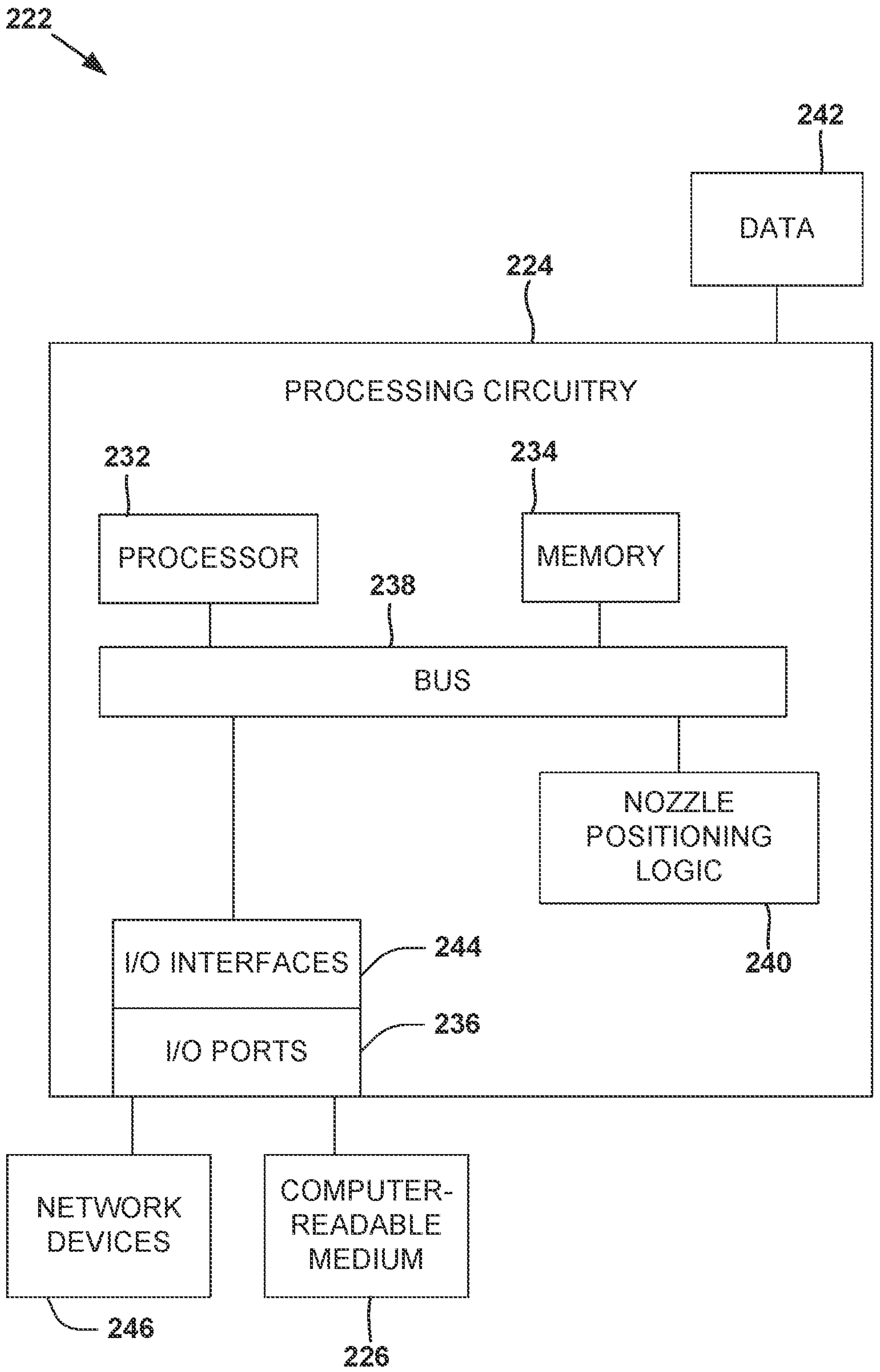
FIG. 9 is a schematic of a computing-system embodiment.

Controller 210 is mounted to main housing and configured to control motor 140 and hydraulic cylinder 160. In an illustrative embodiment, controller 210 is implemented as a computing system 222, as shown in FIG. 9, that is configured and/or programmed with one or more of the example systems and methods described herein, and/or equivalents. As shown, the computing system 222 includes processing circuitry 224 that is responsive to input instructions corresponding to operational states of the apparatus 10, to control adjustment of a position, orientation, or other property of the nozzle 190 as described herein. For example, the input instructions can be included as a data structure pre-programmed and stored in a non-transitory, computer-readable medium 226; manually input by an operator during operation of the apparatus 10 via a network device 228 such as a user interface, for example; correspond to control signals transmitted by an automated network device 228 such as one or more sensors to be received by the processing circuitry 224, any combination thereof, or otherwise transmitted to the processing circuitry 224.

As an example, the processing circuitry 224 includes a processor 232, an integrated memory 234, and input/output ports 236 controlled by an input/output (I/O) interface 244 operably connected by a data bus 238. Examples of the processor 232 include, but are not limited to single or multi-processor architectures. The processing circuitry 224 can include nozzle positioning logic 240 that controls a position and/or orientation of the nozzle 190 as described herein. The nozzle positioning logic 240 may be implemented in hardware, a computer-readable medium with stored instructions that are executable by processor 232, firmware, and/or combinations thereof. While the nozzle positioning logic 240 is illustrated as a hardware component attached to data bus 238, it is to be appreciated that in other embodiments, the nozzle positioning logic 240 could be implemented in processor 232, stored in memory 234, or stored in a remote computer-readable medium 226 or other electronic storage device that is separate from, but operatively connected to processing circuitry 224. For embodiments including remote computer-readable medium 226, computer-readable medium 226 may be operably connected to processing circuitry 224 via, for example, an input/output (I/O) interface (e.g., card, device) 244, which includes one or more of the input/output ports 236.

The processing circuitry 224 described above can be integrated with, and form a portion of apparatus 10. As another example, nozzle positioning logic 240 and/or processing circuitry 224 can constitute a means (e.g., structure: hardware; non-transitory, computer-readable medium; firmware; etc.) for performing the actions described herein that is remotely located, but operatively connected to the apparatus 10 via a suitable communication channel. Examples of such embodiments include, but are not limited to processing circuitry 224 configured as a server or other terminal operating in a cloud computing system, such as a smartphone, laptop, desktop, tablet computing device, and so on, that remotely transmits control instructions to apparatus 10 for controlling nozzle 190, and accordingly, a direction of fluid spray. Such means may be implemented, for example, as an application-specific integrated circuit ("ASIC"), programmed to receive relative or absolute positional data for controlling nozzle 190, parse the positional data to generate the corresponding control instruction that, when executed, drives motor 140 and/or hydraulic cylinder 160 as described herein. As another example, the means may also be implemented as stored computer-executable instructions that are presented to processing circuitry 224 as data 242 from a remote source over a communication network, that are temporarily stored in memory 234 and then executed by processor 232. Examples of the communication network include, but are not limited to, a local area network ("LAN"), a wide area network ("WAN"), and other networks.

The processing circuitry 224 may interact with one or more of the network devices 246 via. I/O interfaces 244 and input/output ports 236. Input/output devices may be, for example, any type of user interface that allows an operator to input a command for controlling the position of nozzle 190. According to some embodiments, examples of I/O devices 246 include, but are not limited to, a keyboard, a microphone, a pointing and selection device, joystick, cameras, video cards, displays, the computer-readable medium 226, other devices operatively connected to the processing circuitry 224 via a communication network, and so on. The input/output ports 236 may include, for example, serial ports, parallel ports, USB ports, wireless communication channels (e.g., Bluetooth radios, IEEE 802.1x compliant radios, etc).

In one or more embodiments, the disclosed methods or their equivalents are performed by either: computer hardware configured to perform the method; or computer instructions embodied in a module stored in computer-readable medium where the instructions are configured as an executable algorithm configured to perform the present processes when executed by at least a processor of processing circuitry 224.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in one embodiment" does not necessarily refer to the same embodiment, though it may.

A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" and "memory," as used herein, refer to a non-transitory medium that stores instructions and/or data configured to perform one or more of the disclosed functions when executed by at least a processor. Data may function as instructions in some embodiments. A computer-readable medium 226 and memory 234 may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium 226 and memory 234 may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read-only memory (ROM), a memory chip or card, a memory stick, solid-state storage device (SSD), flash drive, and other media from which a computer, a processor or other electronic device can retrieve and store data and/or instructions. Each type of media, if selected for implementation in one embodiment, may include stored instructions of an algorithm configured to perform one or more of the disclosed and/or claimed functions.

"Logic," as used herein, represents a component that is implemented with computer or electrical hardware (e.g., computer-readable medium 226 and/or memory 234), a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions.

An "operable connection," or a connection by which entities are "operably connected," is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

Figure 11:
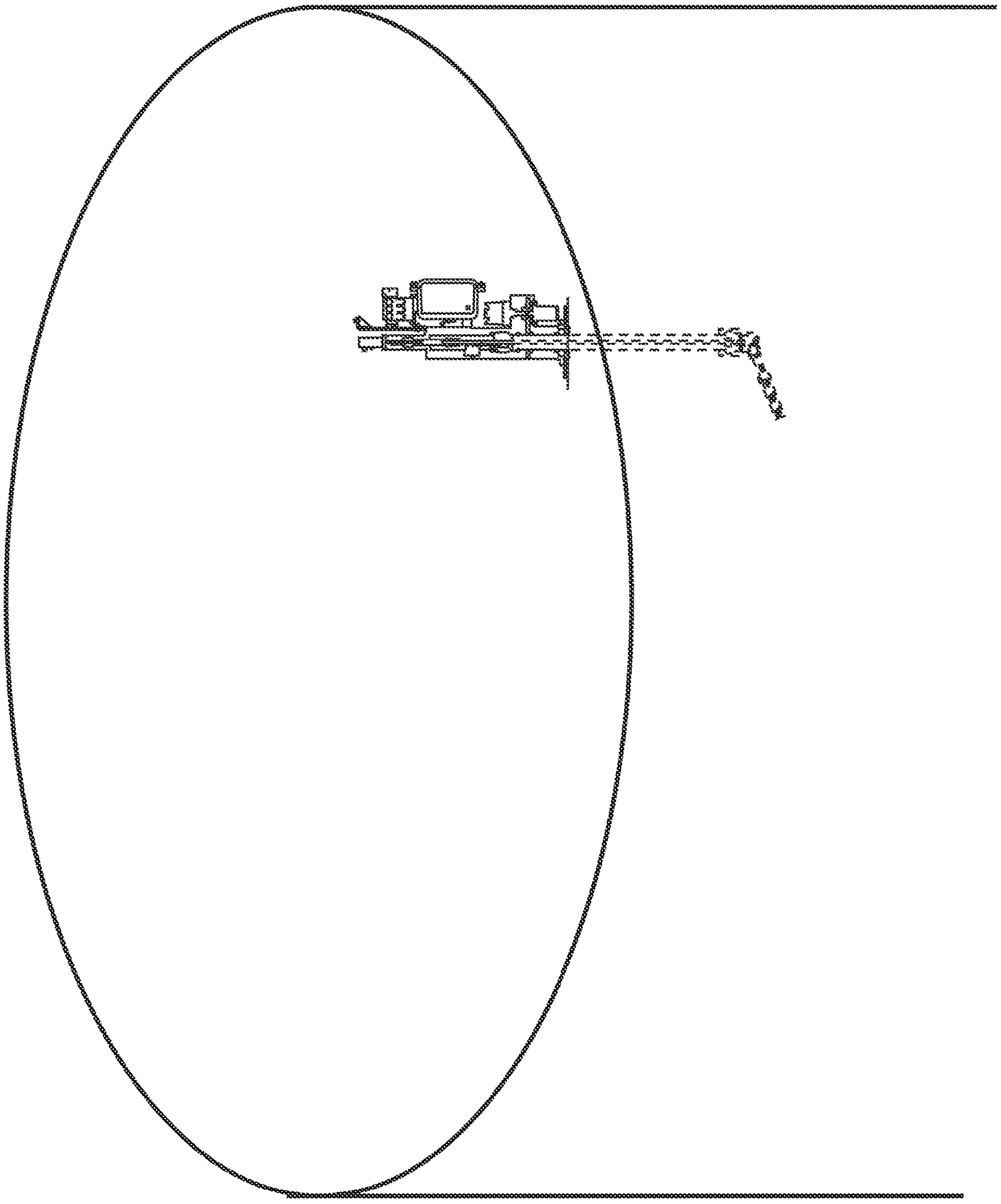
FIG. 11 is a perspective view of an embodiment mounted to a storage-tank rooftop.

Mounting flange 200 is fixedly attached to main housing 110 and configured to facilitate mounting apparatus 10 to a substantially planar surface. In embodiments, and as shown in FIGS. 10 and 11, mounting flange 200 is configured to facilitate mounting apparatus 10 onto a substantially planar fluid storage tank roof (shown but not numerated) such that when mounted, main housing 110 is positioned above the fluid-storage-tank roof and both primary fluid conduit 120 and nozzle 190 are positioned within the fluid storage tank. For the purposes of this invention, a fluid storage tank roof having slight curvature is considered to be substantially planar. In a fluid-storage-tank-roof-mounted embodiment, primary fluid conduit 120 extends approximately four feet below mounting flange 200 and into a storage tank. In still other roof mounting embodiments, primary fluid conduit 120 extends below mounting flange 200 and into a storage tank any useful distance as is determined through routine experimentation; stated differently, primary fluid conduit 120 can be any useful length as is determined through routine experimentation.

Figure 12:
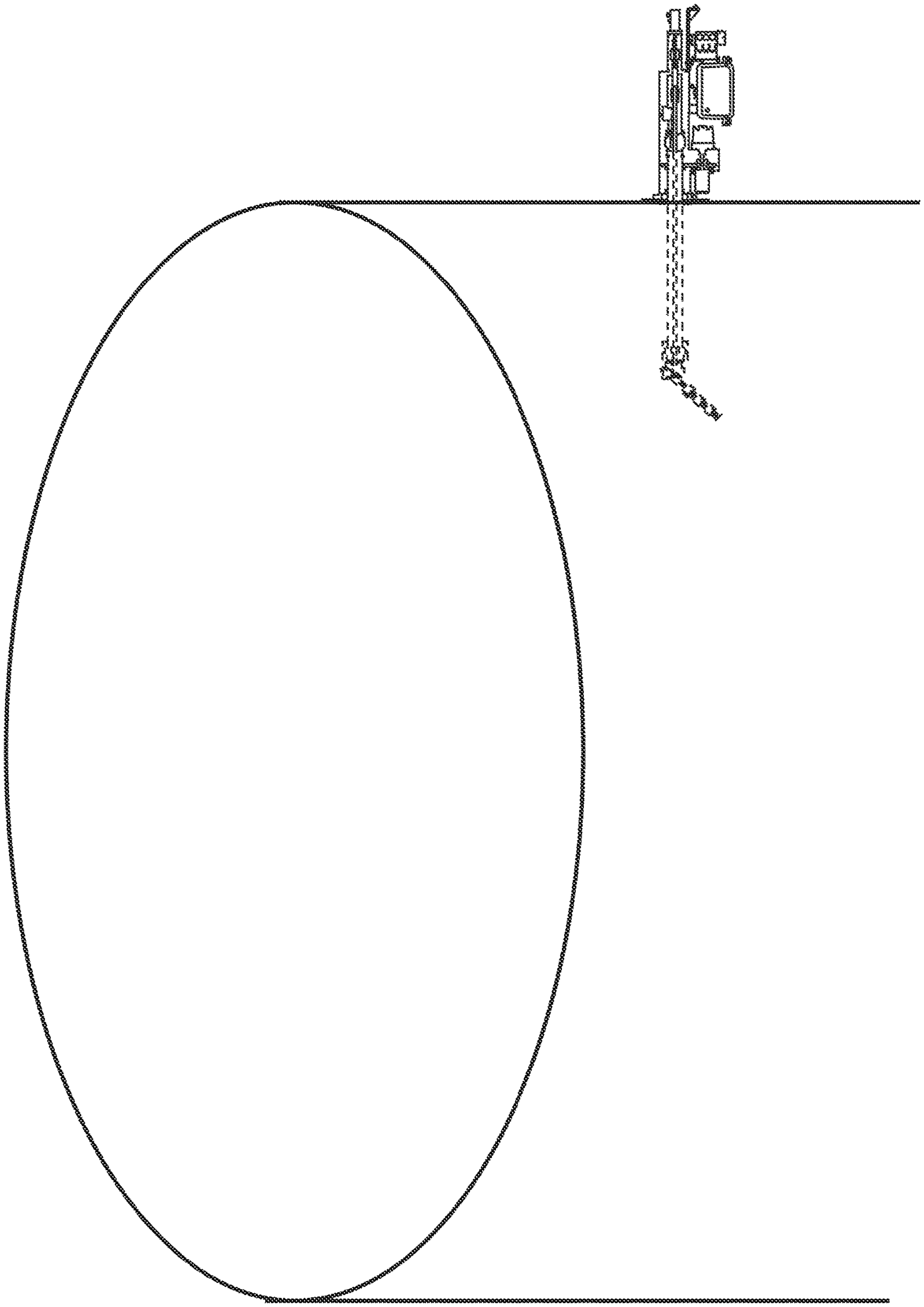
FIG. 12 is a perspective view of an embodiment mounted to a storage-tank sidewall.

In other embodiments, as shown in FIG. 12, mounting flange 200 is configured to mount apparatus 10 to a fluid-storage-tank sidewall such that when mounted, primary fluid conduit 120 is perpendicular or normal to a substantially planar fluid storage tank sidewall; for the purposes of this invention, a fluid storage tank sidewall having slight curvature is considered to be substantially planar. In embodiments, mounting flange 200 is configured to mount apparatus 10 onto a substantially planar fluid-storage-tank sidewall such that when mounted, main housing 110 is positioned outside of the fluid-storage-tank sidewall and both primary fluid conduit 120 and nozzle 190 are positioned within the fluid storage tank. In another sidewall mounted embodiment, primary fluid conduit 120 extends approximately four feet into a storage tank. In still other fluid-storage-tank sidewall mounting embodiments, primary fluid conduit 120 extends into a storage tank any useful distance as is determined through routine experimentation; stated differently, primary fluid conduit 120 can be any useful length as is determined through routine experimentation. In sidewall mounting embodiments, the angle created by nozzle first position and the nozzle second position is about 160°; in other embodiments, the angle created by nozzle first position and the nozzle second position is about 180°.

Apparatus 10 is configured to withstand fluid pressures up to 1,000 psi. In embodiments, operating pressures range from 300 psi to 600 psi.

In addition to the above embodiments that describe hydraulically driven components, in alternate embodiments, those hydraulically driven components can be replaced or interchanged with pneumatically driven components. Persons of ordinary skill in the art will be able to interchange pneumatic and hydraulic components without having to exercise undue experimentation.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described.

What is claimed is:

1. An apparatus for cleaning a surface with a liquid jet, the apparatus comprising:

- a main housing;
- a primary fluid conduit having a longitudinal axis and two ends, a fluid-intake end and a fluid-exit end;
- a gear assembly;
- a motor mounted to the main housing and configured to engage the gear assembly and thereby rotate the primary fluid conduit about the primary-fluid-conduit longitudinal axis;
- a bifurcated head connected to the primary-fluid-conduit fluid-exit end, the bifurcated head having two fluid conduits;
- a hydraulic cylinder;
- a hydraulic-cylinder rod having a first end and a second end;
- a pivot pin having a longitudinal axis and the pivot pin being attached to the bifurcated head;
- a nozzle connected pivotally to the pivot pin;
- the hydraulic cylinder mounted to the main housing and configured to move the hydraulic-cylinder rod along a linear path by exerting a unidirectional force upon the first end of the hydraulic-cylinder rod;
- the hydraulic-cylinder rod positioned within the primary fluid conduit and the second end of the hydraulic-cylinder rod pivotally connected to the nozzle; and the nozzle configured to pivot about the pivot-pin longitudinal axis as the hydraulic-cylinder rod moves along the linear path.

2. The apparatus of claim 1, further comprising a mounting flange upon which the apparatus is configured to mount to a substantially planar surface.

3. The apparatus of claim 1, further comprising a controller configured to rotate the primary fluid conduit by engaging the motor and pivot the nozzle by engaging the hydraulic cylinder.

4. The apparatus of claim 1, wherein the motor is a hydraulic motor.

5. The apparatus of claim 1, wherein the apparatus further comprises a rotational positional sensor that is configured to sense the rotational position of the primary fluid conduit.

6. The apparatus of claim 1, wherein the bifurcated head has parallel fluid conduits.

7. An apparatus for cleaning a surface with a liquid jet, the apparatus comprising:

a main housing;

a primary fluid conduit having a longitudinal axis and two ends, a fluid-intake end and a fluid-exit end;

a gear assembly;

a motor mounted to the main housing and configured to engage the gear assembly and thereby rotate the primary fluid conduit about the primary-fluid-conduit longitudinal axis;

a bifurcated head connected to the primary-fluid-conduit fluid-exit end, the bifurcated head having parallel fluid conduits;

a hydraulic cylinder;

a hydraulic-cylinder rod having a first end and a second end;

a pivot pin having a longitudinal axis and the pivot pin being attached to the bifurcated head;

a nozzle connected pivotally to the pivot pin;

the hydraulic cylinder mounted to the main housing and configured to move the hydraulic-cylinder rod along a linear path by exerting a unidirectional force upon the first end of the hydraulic-cylinder rod;

the hydraulic-cylinder rod positioned within the primary fluid conduit and the second end of the hydraulic-cylinder rod pivotally connected to the nozzle;

the nozzle configured to pivot about the pivot-pin longitudinal axis as the hydraulic-cylinder rod moves along the linear path;

a mounting flange upon which the apparatus is configured to mount to a substantially planar surface;

a controller configured to rotate the primary fluid conduit by engaging the motor and pivot the nozzle by engaging the hydraulic cylinder; and a rotational positional sensor that is configured to sense the rotational position of the primary fluid conduit.

8. An apparatus for cleaning a surface with a liquid jet, the apparatus comprising:

a main housing;

a primary fluid conduit having a longitudinal axis and two ends, a fluid-intake end and a fluid-exit end;

a gear assembly;

a motor mounted to the main housing and configured to engage the gear assembly and thereby rotate the primary fluid conduit about the primary-fluid-conduit longitudinal axis;

a bifurcated head connected to the primary-fluid-conduit fluid-exit end, the bifurcated head having at least one fluid conduit;

a cylinder;

a cylinder rod having a first end and a second end;

a pivot pin having a longitudinal axis and the pivot pin being attached to a head having a fluid-conduit therein;

a nozzle connected pivotally to the pivot pin;

the cylinder mounted to the main housing and configured to move the cylinder rod along a linear path by exerting a unidirectional force upon the first end of the cylinder rod;

the cylinder rod positioned within the primary fluid conduit and the second end of the cylinder rod pivotally connected to the nozzle; and the nozzle configured to pivot about the pivot-pin longitudinal axis as the cylinder rod moves along the linear path.

9. The apparatus of claim 8, further comprising a mounting flange upon which the apparatus is configured to mount to a substantially planar surface.

10. The apparatus of claim 8, further comprising a controller configured to rotate the primary fluid conduit by engaging the motor and pivot the nozzle by engaging the cylinder.

11. The apparatus of claim 8, wherein the motor is a hydraulic motor.

12. The apparatus of claim 8, wherein the apparatus further comprises a rotational positional sensor that is configured to sense the rotational position of the primary fluid conduit.

13. The apparatus of claim 8, wherein the bifurcated head has parallel fluid conduits.

* * * * *